United States Patent
Serrander et al.

(10) Patent No.: US 6,614,962 B1
(45) Date of Patent: Sep. 2, 2003

(54) METHOD AND A DEVICE FOR INSTALLING OPTICAL FIBRES

(75) Inventors: Hans Serrander, Stockholm (SE); Per-Anders Andersson, Fjärras (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/936,162
(22) PCT Filed: Mar. 13, 2000
(86) PCT No.: PCT/SE00/00492
§ 371 (c)(1), (2), (4) Date: Jan. 29, 2002
(87) PCT Pub. No.: WO00/54087
PCT Pub. Date: Sep. 14, 2000

(30) Foreign Application Priority Data

Mar. 11, 1999 (SE) .................................................. 9900877

(51) Int. Cl.[7] .............................. G02B 6/52; H02G 1/08
(52) U.S. Cl. ....................... 385/45; 385/134; 254/134.4
(58) Field of Search ........................... 254/134.3, 134.4; 385/45, 133–140, 114

(56) References Cited

U.S. PATENT DOCUMENTS

| 5,022,634 | A | * | 6/1991 | Keeble | 254/134.4 |
| 5,781,678 | A | * | 7/1998 | Sano et al. | 385/45 |
| 6,341,188 | B1 | * | 1/2002 | Serrander et al. | 385/114 |
| 6,511,047 | B1 | * | 1/2003 | Clemente | 254/134.4 |

* cited by examiner

Primary Examiner—Akm Enayet Ullah
Assistant Examiner—Jerry T Rahll

(57) ABSTRACT

The present invention relates to a method and to apparatus for installing optical fibres in duct systems or like tubular runways, and then preferably for installing optical fibres in duct systems arranged in dwelling rooms in apartment blocks. By using a subpressure that acts from a centrally located suction device connected to the duct system, it is possible to draw one or more optical fibres (19), possibly simultaneously, by suction through a duct (13) in the duct system and lead said fibre or fibres to a centrally arranged collecting point common to said fibres. Handling of the optical fibre and feeding of the fibre into a respective duct is facilitated by placing the suction device centrally in the duct system and by placing a drum (20) on which the optical fibre is coiled at the mouth (14) of the duct, therewith enabling the fibre to be installed by a single workman more quickly than would otherwise be the case.

8 Claims, 3 Drawing Sheets

METHOD AND A DEVICE FOR INSTALLING OPTICAL FIBRES

FIELD OF INVENTION

The present invention relates to a method of installing optical fibres in duct systems or like tubular systems, and also to a device for installing optical fibres in duct systems or like tubular systems. The invention is conceived for use preferably in installing optical fibres in a duct system provided in connection with living accommodation building structures, such as in apartment blocks or like buildings.

DESCRIPTION OF THE BACKGROUND ART

It is known to blow optical fibres through ducts or like tubular runways with the aid of pressurised air, for instance when installing optical fibres in the apartments of an apartment block. The pressurised air is normally delivered to a duct location at which the optical fibre is introduced, and there transforms into an air flow which engages around the fibre and drives the fibre forwards in the duct. The speed at which the optical fibre is fed through the duct can be controlled by correspondingly adapting the air pressure, and therewith the power of the air flow acting on the fibre.

Earlier publications EP 0 319 194 A1 and GB 2 152 621 A teach methods and devices for sucking optical fibres into a duct with the aid of a suction device which generates subpressure in the duct for advancement of the fibre in the duct.

SUMMARY OF THE INVENTION

With the intention of simplifying the handling of optical fibres when installing optical fibres in duct systems that lead to outlets in various residential spaces in an apartment block for instance, there has been applied to this end a subpressure generated by a suction device located at a central collecting point which is common to all optical fibres in the duct system, such as a fibre accommodating star duct system, therewith obviating the need to move the suction device between the various optical fibre input points, as distinct from the case when the optical fibres are blown into said ducts, and also obviating the need of separate nozzles for different types of optical fibres, as distinct from the case when blowing optical fibres into the ducts. By first providing each connection point and outlet in respective apartments with a store of optical fibres that have been previously connected electrically at one end, and then drawing one optical fibre or a number of optical fibres simultaneously from the store of optical fibres to said collecting point, the optical fibre or said several optical fibres can be installed in the duct system by means of one single workman. The end of each optical fibre can then be connected at said connecting point to an optical fibre connecting device provided at said point. Suction of optical fibres into duct systems eliminates problems that occur when blowing said fibres into the ducts, such as the ingress of water or oil into the ducts from the blower or the compressor. The use of subpressure also simplifies connection of the ducts to the optical fibres. The ducts can be readily joined, by simply placing a rubber hose joint around the duct joins.

The present invention differs form the earlier known fibre blow-in methods by virtue of the fact that in accordance with the invention the optical fibres are sucked into an installed duct system that includes a centrally arranged suction device, as distinct from known methods in which the optical fibres are blown individually into the various ducts of the duct system.

In principle, suction of the optical fibres into a duct system is based on similar physiological laws that apply when blowing optical fibres into said system, in other words on the basis of a pressure difference that acts between the two end openings of the existing duct that is created by an air flow therein, where said pressure difference strives to achieve equilibrium. Different pressure conditions and different air flows can be obtained, by controlling the suction force through the medium of a suction device connected to the duct. A pulling force can be generated in one end of the optical fibre, with the aid of a body in the form of a plastic pilot device that has a rounded top and mounted on said fibre end. The magnitude of this pulling force will depend partially on the magnitude of the "pneumatic resistance" exerted by the body/pilot device. This resistance can be regulated by appropriate dimensioning of the body/pilot device concerned. A combination of an existing pressure difference and a suitable pilot device can provide the most favourable conditions between the pulling force on said end of the optical fibre and the frictional forces that occur between the air passing through the duct and the optical fibre present therein. One important advantage obtained with sucking optical fibres through ducts instead of blowing the fibres therethrough is that no separate nozzles are required for different types of optical fibres. Another advantage is that no "reverse air flow" occurs, as distinct to the case when blowing optical fibres through the ducts.

Feeding of the optical fibre or the optical fibres through a duct system is achieved with the aid of the pulling forces exerted by the pilot device on said fibre or fibres and/or with the aid of the aerodynamic influence of the air flow on said fibre or fibres. The pulling forces occurring in the optical fibres are generally marginal and will not have any undue effect thereon.

The length of optical fibre required, including any necessary additional length, is coiled onto a static unwinding drum or like device at the end of the duct into which the optical fibre shall be fed. Subsequent to having generated a sufficiently large subpressure in the duct, the end of the optical fibre is inserted into the duct and therewith advance along the duct, said fibre end possibly being provided with a tuft of appropriate material. The fibre infeed sequence can be easily controlled, by lightly retarding the speed at which the optical fibre is fed into the duct. When practically all of the fibre length has been drawn through the duct, insertion of further fibre is stopped, either by braking advancement of the fibre or by switching off the device used to generate the necessary subpressure. The optical fibre or optical fibre ribbon sucked into the duct may be of a single mode or a multimode type and may have been fitted with an electric contact device at one end/the final end. A collecting container for collecting any optical fibre surplus may be placed at the end of the duct at which the suction device is located, said container optionally being connected to said suction device. A filter will preferably be connected between the suction device and the collecting vessel. The collecting vessel will preferably be dimensioned to adequately accommodate an optical fibre surplus and will be constructed so as to enable the interior of the container to be seen. The invention is preferably intended for use in the "short distance installation" of optical fibres. The invention can also be applied in respect of optical fibre cable elements which include several optical fibres that are held together with helically overlapping bands, and also in respect of optical fibre ribbons, such ribbons being much more robust than individual optical fibres and have greater tensile strength.

Suction feeding of optical fibres in duct systems also enables two different optical fibres to be readily joined or connected in two meeting ducts, by connecting the two inner duct-ends to the suction device and introducing the optical fibres into respective outer duct-ends. When the ends of the optical fibres have met between the two inner duct-ends, the fibres can be joined together or connected to a connecting device located at said meeting place.

Typical installation lengths will be less than 50 meters. As a result of the present invention, the optical fibre need not be specially treated prior to installation in order to improve suction properties, and it is possible to use a standard optical fibre. A typical installation case is an apartment in which different outlets having optical termination points in the form of wall sockets shall be installed. Fibre installation can be simplified with the aid of so-called fibre ducts or tubular fibre runways that have been installed in the apartment concerned, either in existing channelling or directly in a space located in a partition wall. The fibre ducts are provided with a number of branch ducts (Y pipes) at the planned wall outlets along the ducts. The inlets to the various Y pipes are plugged temporarily and when a subpressure is applied at the central connecting point in the apartment, one or more optical fibres can be fed into the duct at the distal wall outlet. Upon completion of the first fibre suction operation, the optical fibre/optical fibres is/are fixed in the opening and the opening between duct and optical fibre, optical fibres or optical fibre ribbon is closed. The plug at the next distal wall outlet is then removed and an optical fibre or optical fibres is/are sucked in therefrom, this procedure being repeated until installation is complete. The use of standard optical fibre ribbons having a smooth and slippery acrylate cover for instance will enable an optical fibre ribbon sucked through a duct to pass by an earlier installed optical fibre ribbon in the process. The optical fibres or ribbons may be treated with an antistatic agent, such as a lubricant or talcum powder, to avoid the fibres or ribbons from sticking in the duct as a result of to static electricity. Because only one suction device is used, the suction device can be placed centrally and need not be moved from its initial position, as distinct to when the fibres are blown through respective ducts and where it is necessary to position a compressor at respective blow-in locations.

The present invention will now be described in more detail with reference to preferred embodiments thereof and also with reference to the accompanying drawings.

DETAILED DESCRIPTION OF PREFERRED EMBODIMENTS

Figure 1:
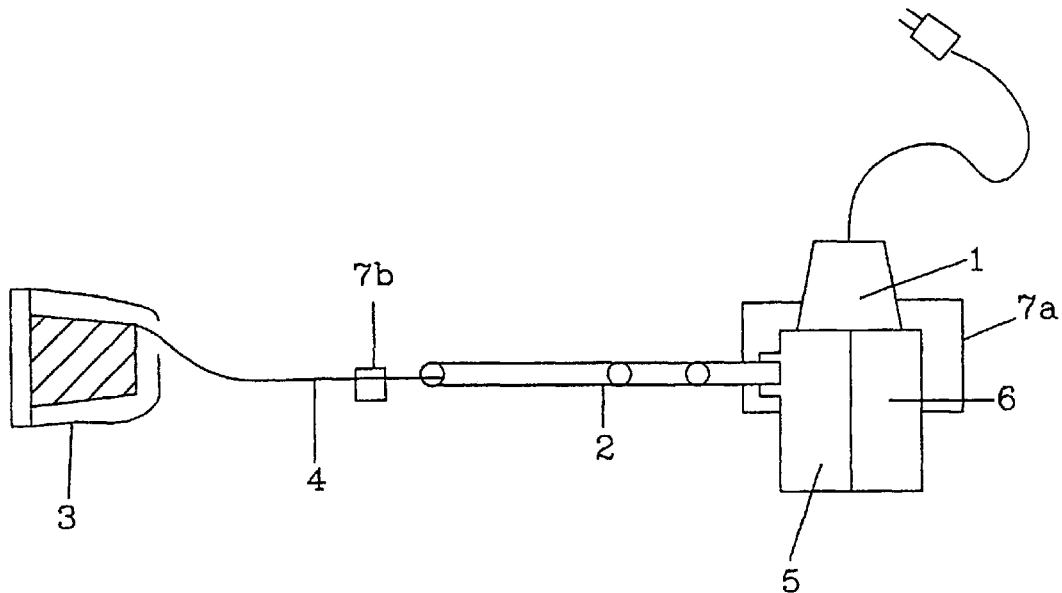
FIG. 1 is a simplified illustration of a device for sucking optical fibres through ducts in accordance with the invention.

FIG. 1 is a simple illustration of how a suction device 1 is connected to one or more optical fibre installation ducts 2. An optical fibre is taken from a drum 3 and the end of the fibre 4 inserted into the mouth of the duct and then sucked in through the duct. This end of the fibre is drawn into a collecting container 5 connected to the suction chamber of the suction device. The suction device may be connected to a subpressure accumulator/vacuum tank 6 which at the initial stage of the suction process imparts to the optical fibre a brief stationary or intermittently elevated subpressure effect which assists in initiating infeeding of the optical fibre. The suction device may comprise a controllable, electrically powered suction/vacuum motor which includes the suction chamber, and the collecting container may be connected to one duct-end. When the suction motor is running, a subpressure will be created in the suction chamber and the optical fibre will be sucked through the duct, after first having inserted one end of the fibre into the outer end of the duct. Suction of the fibre through the duct can be terminated, when said fibre-end has reached the collecting container in the suction motor. The length of optical fibre wound on the drum can be adapted to the length of the duct concerned, such that when all of the optical fibre has been sucked into the duct only a short length of fibre will remain together with a connector attached thereto and connectable to telecommunications equipment installed in a dwelling, for instance.

The device may include a monitoring and control element 7a for monitoring and controlling the infeed of the optical fibres with the aid of means for detecting pressure and the position of the optical fibres connected to the duct system. The measurement values recorded by the detecting and sensing means are delivered to the monitoring and control element for controlling the suction device for correct infeed of the optical fibres. An infeed device 7b positioned at the mouth of the duct is able to influence the infeed of an optical fibre or fibres, by retarding or pushing the optical fibres, wherewith the length of fibre fed into the duct and the speed at which said fibre is fed can be registered with the infeed device.

Figure 2:
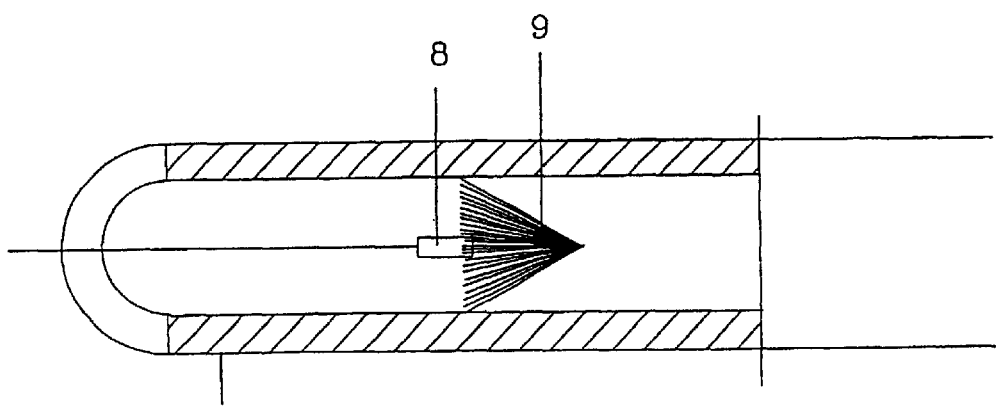
FIG. 2 illustrates, partly in cross-section, a duct into which an optical fibre provided with a pilot element has been inserted in accordance with the invention.

FIG. 2 illustrates, partly in cross-section, one end 8 of an optical fibre that has been fed into the duct 2. This end of the optical fibre has been fitted with a soft tuft-like body, for instance similar to a fly used by fly fishermen, such as to impart an additional pulling force to the optical fibre as it moves forward in the duct. Alternatively, this end of the fibre may be fitted with a plastic pilot element that has a rounded top. The pilot element will preferably consist of compressible material that results in low surface friction in the forward movement direction of the fibre and which exerts a pneumatic resistance to a passing air flow and which, at the same time, has a certain mass.

Figure 3A:
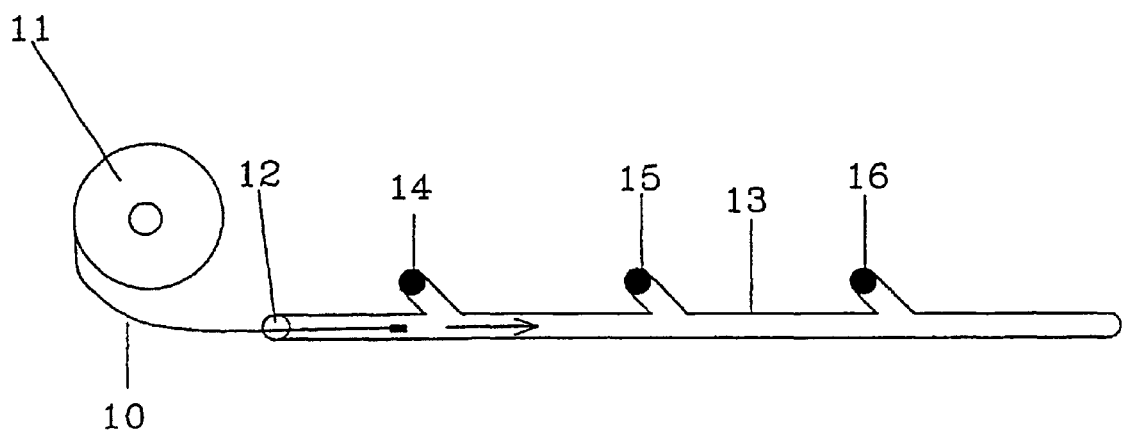
FIGS. 3A and B illustrate a method of sucking several optical fibres through a duct in accordance with the invention.

FIG. 3A is a simplified illustration showing a first optical fibre 10 that has been taken from a first drum 11 and sucked into a first outlet 12 of a duct 13 that includes several outlets, referenced 14–16, said duct being assumed to be located in a dwelling, such as an apartment. The first outlet is open while remaining outlets are closed, for instance plugged.

Figure 3B:
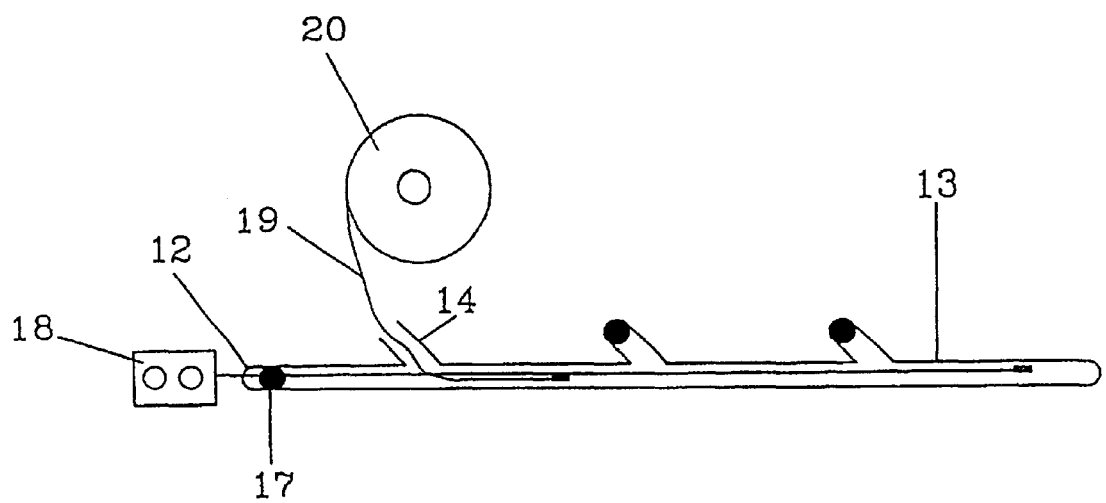

FIG. 3B is a simplified illustration that shows the first outlet 12 closed with a plug 17 and also shows the optical fibre drawn by suction along the full length of the duct, with one end of the fibre connected to an electric connector 18. The second outlet 14 is open and a second optical fibre 19 is fed into the duct by suction, from a second drum or reel 20. Remaining outlets in the duct are closed. By drawing in optical fibres from several outlets to a central point and allowing the fibres to pass in one and the same duct, the total length of duct used will be smaller and a smaller quantity of optical fibres will be used in so-called star net solutions.

It is also conceivable to combine the present invention with the fibre blow-in technique in order to increase the length of fibre that is blown through the duct or to achieve a given fibre infeed effect in different phases of installation with the aid of a simplified blowing technique in the absence of a compressor but with the aid of a pressurised bottle of compressed dry air.

Figure 4:
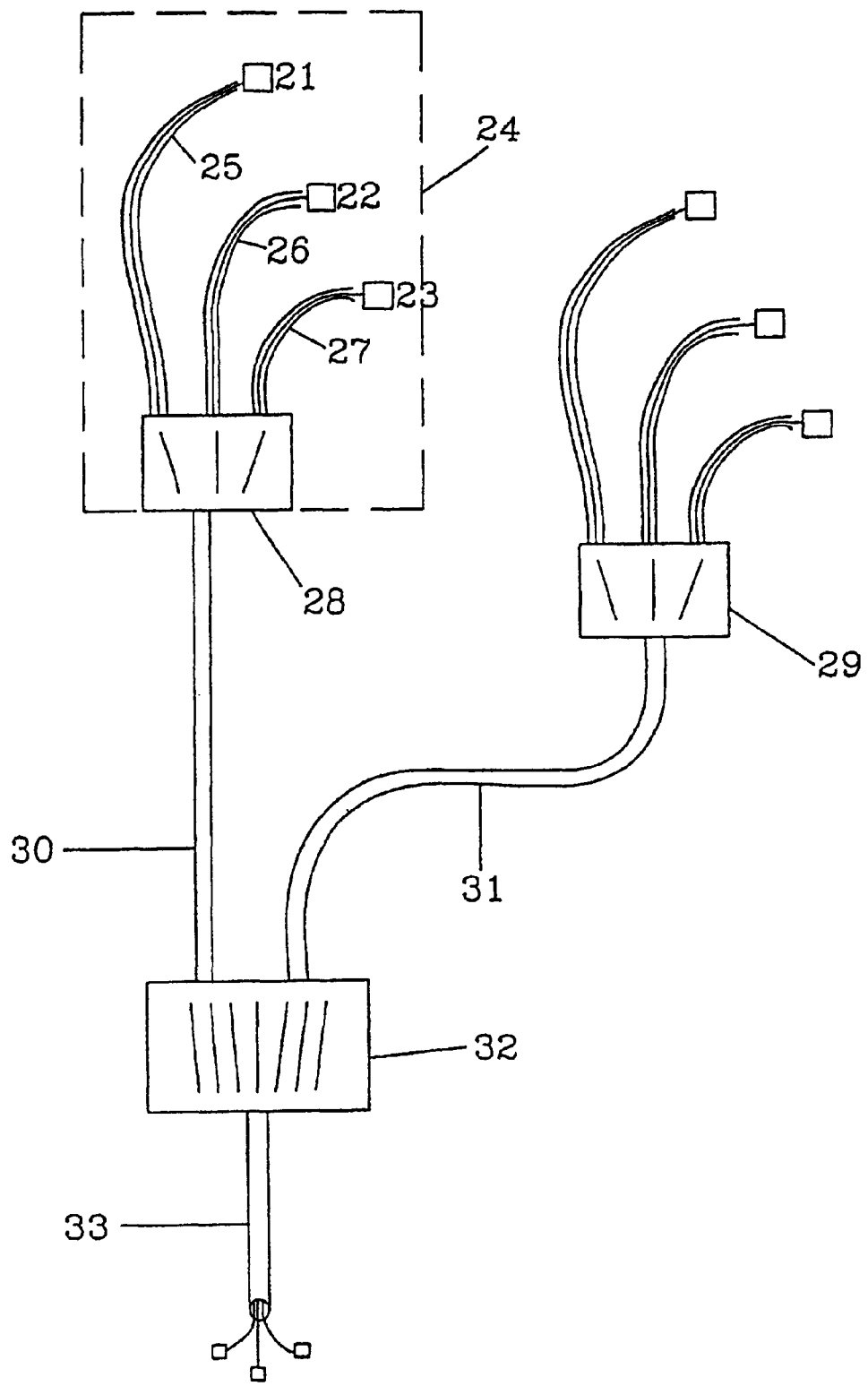
FIG. 4 illustrates a system with optical fibres sucked into a duct system in accordance with the invention.

FIG. 4 is a schematic illustration showing how an optical fibre system can be installed in a building that includes several apartments. Optical fibres or optical fibre ribbons extend in ducts 25–27 from a preconnected outlet 21–23 in a first apartment 24 to a passive coupler or splitter 28. Optical fibres extend in microducts 30, 31 . . . from each of the couplers or splitter 28, 29 . . . in respective apartments to a central connecting unit 32 which is common to all apartments in the building. Optical fibres then pass from the fibre connecting unit in a subduct 33 and the ends of the optical fibres may then be connected to a preconnected MT connector for further connection to appropriate equipment. The optical fibres that shall be installed in the ducts present in the apartments may suitably be drawn into the ducts by suction, wherewith the suction device is connected to a collecting point in the vicinity of the aforesaid passive coupler or splitter 28, 29. However, the optical fibres may also be advanced in the so-called microducts and possible also in the outwardly lying subduct by means of subpressure, by connecting the suction chamber of the suction motor to the central fibre connecting unit and to the end of the subduct for connection of the optical fibres to the equipment connecting means.

It will be understood that the invention is not restricted to the aforedescribed and illustrated exemplifying embodiments thereof and that modifications can be made within the scope of the accompanying claims.

What is claimed is:

1. A method of installing optical fibres in duct systems or like tubular runways, characterised by sucking one or more optical fibres, either individually or several simultaneously, through one or more ducts in a duct system up to a common collecting point, wherein each optical fibre has a connector at one end, wherein the other end of the fibre may be fitted with a pull body, and wherein coiled optical fibres can be uncoiled and sucked through the duct system up to said common collecting point.

2. Apparatus for installing optical fibres in duct systems or like tubular runways, characterised by a suction device which is intended for connection in said duct system to a collecting point that is common to all optical fibres installed; in that the suction device is adapted to generate a subpressure in the duct system; and wherein the subpressure generated by said suction device can be caused to actuate one or more optical fibres placed in the inlets of said duct system for the purpose of advancing said fibres in said system to said common collecting point.

3. Apparatus according to claim 2, characterised in that one end of each optical fibre is fitted with a device, e.g., a pilot device, for increasing the effect of the subpressure on the optical fibre during its advancement through a duct.

4. Apparatus according to claim 2, characterised in that the suction device includes a subpressure accumulator for infeeding said optical fibres, wherein an elevated subpressure effect can be obtained when sucking the optical fibres into said duct system.

5. Apparatus according to claim 2, characterised in that the suction device is adjustable.

6. Apparatus according to claim 2, characterised by an automatic monitoring and controlling means which functions to feed one or more optical fibres in the duct system from their respective inlets to said common collecting point in conjunction with detecting means and said suction device.

7. Apparatus according to claim 2, characterised in that the suction device includes an optical fibre collecting container.

8. Apparatus according to claim 7, characterised in that said device is a tuft of soft material similar to a fishing fly.

* * * * *